(12) United States Patent
Roberts (10) Patent No.: US 6,222,652 B1
(45) Date of Patent: Apr. 24, 2001

(54) METHOD OF AND APPARATUS FOR DETECTING TRANSIENTS IN AN OPTICAL TRANSMISSION SYSTEM

(75) Inventor: Kim Byron Roberts, Herts (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/879,751

(22) Filed: Jun. 20, 1997

(51) Int. Cl.[7] ................................................. H04B 10/08
(52) U.S. Cl. .................................................................. 359/110
(58) Field of Search .................................. 359/110, 142, 359/143, 144, 152

(56) References Cited

U.S. PATENT DOCUMENTS

| | | | |
|---|---|---|---|
| 4,184,056 | * | 1/1980 | Basch et al. ........................ 359/110 |
| 4,451,916 | * | 5/1984 | Casper et al. ....................... 359/110 |
| 4,833,668 | * | 5/1989 | Rowley et al. ..................... 359/110 |
| 5,513,029 | | 4/1996 | Roberts ............................... 359/177 |
| 5,541,759 | * | 7/1996 | Neff et al. ........................... 359/110 |
| 5,596,440 | * | 1/1997 | Patz et al. ........................... 359/110 |
| 5,808,760 | * | 9/1998 | Gfeller ................................ 359/110 |

FOREIGN PATENT DOCUMENTS 0448293  9/1991  (EP) .

\* cited by examiner

Primary Examiner—Jeffery Hofsass
Assistant Examiner—John Tweel, Jr.
(74) Attorney, Agent, or Firm—Lee, Mann, Smith, McWilliams, Sweeney and Ohlson (57) ABSTRACT

A method of monitoring transients in an optical transmission system having two or more optical elements is disclosed. The method comprises detecting the existence of a transient in the system and determining the cause of the transient or the location of the cause of the transient by monitoring variations in system characteristics.

44 Claims, 7 Drawing Sheets

METHOD OF AND APPARATUS FOR DETECTING TRANSIENTS IN AN OPTICAL TRANSMISSION SYSTEM

FIELD OF THE INVENTION

This invention relates to a method of and apparatus for detecting transients in an optical transmission system and in particular to the detection of power and phase transients in an all optical transmission system.

BACKGROUND OF THE INVENTION

The distance between optical terminals of an optical fibre transmission system is limited by the optical power that can be launched into an optical fibre by optical transmitters in the optical terminals, loss and dispersion of the optical fibres interconnecting the optical terminals and the sensitivity of the optical receivers of the optical terminals. Where the distance between the desired end point of an optical fibre transmission system exceeds the maximum distance between optical terminals, optical amplifiers have been provided. Each optical amplifier comprises an input connector, for receiving the optical signal, connected to an Erbium doped fibre amplifier which is in turn connected to an optical connector for coupling the amplified optical signal into the fibre connected between the optical amplifier and the next optical amplifier or a terminal of the signal.

Clearly a low input power level will result in a short distance between optical amplifiers. As each of these amplifiers are expensive increasing the distance between repeaters is clearly desirable. However, the input of a signal with too high an optical power may result in the signal causing non-linear effects in the fibre, such as Self-Phase-Modulation, that can seriously degrade the signal. Such non-linear effects are especially severe at bit rates at or above 10 Gb/s and the onset of non-linear degradations can be quite sharp.

Therefore, the determination of a suitable input power which is high enough to maximise the distance between optical amplifiers and low enough to prevent the onset of non-linear effects is essential in the production and operation of a successful optical transmission system.

From a theoretical viewpoint this concept does not cause any difficulty. However, when implementing such an optical transmission system it becomes clear that slight variations in the power of an optical system can be caused by a variety of phenomenon and can result in an optical signal moving away from its optimum power level towards too high or too low a power. For example, sinusoidal variations may move the signal to too high a power level at the positive peak or too low a level at the negative peak. Power margins must be allocated in the design of the optical system so that during worse case transients and variations, when combined with other worse case conditions, the data remains error free. Allowing this margin reduces the available performance of a system and thus reduces the maximum allowed amplifier spacings.

Also, even within an appropriate power range, power transients can cause bit errors. For example, if a transient is faster than the automatic gain control in a receiver then the receiver electronics could be momentarily overloaded. These distortions can cause errors. During a transient the electrical signal, or eye, at the decision comparator will be larger or smaller than anticipated. This places the decision threshold at the wrong location in the eye which causes errors. Amplitude transients can cause phase transients in the clock recovery circuits that become jitter issues or even bit errors, as will be discussed in more detail below. Erbium doped fibre amplifiers can cause amplitude transients when employing several wavelengths at once. Consider the simple example of two wavelengths, if one wavelength is removed while the pump power remains constant, then the output power at the other wavelength will increase by 3 dB. The speed of the transient is determined by the pump power and by the response to the Erbium doped fibre and is measured in microseconds. Addition of a second wavelength causes a similar 3 dB drop in the output power of the first wavelength present. Also, Erbium doped fibre amplifiers can introduce transients due to mode-hopping in the pump laser of the amplifier. In addition amplifiers and other optical elements have a polarisation dependent gain or loss and changes in polarisation thereby cause changes in power level. Even vibrations and mechanical movement of optical fibres, connectors and other components of the optical path can alter the loss and so cause variations in the optical power.

An optically amplified link, can be several hundred kilometers long with many optical components such as optical cross-connects, optical amplifiers, couplers, cables, connectors, insulators, WDM filters and dispersion compensation components. When bit errors occur on such a link, it is not presently possible to determine the location or cause of the fault down to a single field replaceable unit. Such transients can cause as little as a 1% fluctuation in power and can arise with a frequency in the range of 0.1 to 1 MHz. Known optical transmission systems utilise so-called loss of signal (LOS) alarms such as the Bellcore TR-253 LOS alarm. With such an alarm the input optical power level is measured and compared to a threshold. One or two dB of hysterises is commonly used in the LOS alarm so as to prevent toggling alarms. A slightly more subtle detector has been implemented where the alarm is raised if the optical power level changes by more than 2 dB within fifteen minutes at the optical receiver, which terminates the optical link. Such an alarm gives an idea of the static power changes i.e. power changes over a long period of time of the order of minutes, but gives only a general indication that a change in power level has occurred somewhere in the optical system. However, this does not isolate where the problem has arisen nor does this give any information on variations and transients that are less than the 2 dB threshold nor transients which are of a much shorter duration.

A total absence of optical power, i.e. the signal is all zeros, for greater than 10 microseconds is also generally detected as a loss of signal alarm.

Another form of detector utilised to determine loss in an optical transmission system is an optical time domain reflectometer (OTDR) which is used to measure the loss in an optical link. However, optical isolators and variations in the level of scattering from optical fibres limit the accuracy of this measurement on complex links. If an OTDR is used while a system is in operation then it must be used at a wavelength that will not interfere with the operation of the system. This means that the loss measured is not the loss at the operating wavelength, which is the important loss, but is in fact the loss at another remote wavelength. An OTDR is useful in measuring substantial failures or changes in the loss of a moderate length of passive optical fibre, but is not generally useful for detecting amplitude transients in a complex optical path.

Thus the prior art consists of circuits that check for large variations in power over relatively long periods or the total absence of power over a shorter period.

However, there are no alarms or monitoring features where the detailed characteristics of power level transients are examined nor where the probable phenomenon causing the transients have been identified nor where the source of a transient is isolated to a field replaceable unit such as an optical cross-connect or an optical amplifier. In fact, there has been no prior art to date which even teaches the desirability of measuring so-called short duration or low level transients which are monitored and determined by the method and apparatus in accordance with the present invention.

U.S. Pat. No. 5,513,029 discloses a method and apparatus for monitoring the performance of optical transmission systems in which an optical signal is modulated with a low frequency dither signal to provide a modulated optical signal having a known modulation depth. This document discloses a method and apparatus therein which can detect power changes of the order of 1 dB or more and does not disclose a system which can monitor transients of a much lower level i.e. in the order of a 0.1% to 5% fluctuation and preferably in the order of 1% fluctuation. However, this document does disclose the concept of monitoring a transmission system periodically throughout the system and comparing the information obtained from these monitoring points.

In all optical systems utilising optical regenerators in place of traditional electrical regenerators, such as a SONET regenerator, the new devices do not acquire frame alignment nor measure bit error rate. These devices can suffer a problem when frame alignment and bit error rate measurement is not undertaken until the terminal at the end of an optical path. Therefore, when a phase transient is created by an optical element such as an optical regenerator, this results in degradation of the optical signal, and problems including loss of frame can ensue. At present the phenomenon causing the phase transient and the optical element in which it occurs can not be readily determined.

The present means of and apparatus for detecting transients also address this problem of phase transients.

SUMMARY OF THE INVENTION

It is an object of this invention to provide a method of and apparatus for monitoring the performance of optical transmission systems which reduce or overcome some or all of the disadvantages of the monitoring techniques described above.

It is another object of this invention to provide a method of and apparatus for detecting the existence of a transient in an optical signal transmitted by an optical system and determining which phenomenon has caused the transient.

It is another object of the present invention to detect a transient and determine which field replaceable optical component of a transmission system has produced the transient.

It is yet another object of the present invention to determine the location and/or phenomenon resulting in a power level transient in an optical transmission system.

It is a still further object of the present invention to determine the location and/or phenomenon resulting in a phase transient in an optical transmission system.

According to a first aspect of the present invention there is provided a method of monitoring transients in an optical transmission system having two or more optical elements, the method comprising detecting the existence of a transient in said system and determining the cause of the transient by monitoring variations in system characteristics.

According to a second aspect of the present invention there is provided a method of monitoring transients in an optical transmission system having two or more optical elements, the method comprising detecting the existence of a transient in said system and determining in which optical element the transient is produced by monitoring variations in system characteristics.

The method provides for the detection of either power or phase transients in said system.

Preferably, this system is monitored at a plurality of monitoring points, each of which being located between adjacent optical elements in the system so that a comparison can be made between information provided from each of the monitoring points. Preferably, the data provided by adjacent monitoring points is scaled, phase-aligned and then subtracted in order to eliminate the effect of variations that are common to two monitoring points. Alternatively, the different data extracted from adjacent measuring points may be directly compared.

Determination may be made as to the rise time of a transient, the overall shape of a transient or the number of rises in a transient and this information may be compared with known data from known transient producing phenomenon.

Alternative characteristics of a transient may be determined by calculation of the slope, mean, relative slope or the Root Mean Square variation of a transient or any other characteristic which could be calculated and would be known to a person skilled in the art without departing from the scope of the present invention.

Also, such measurements may be made for specific frequency components of the data provided by the monitoring points, for example, 0 to 58 Hz, 59 to 62 Hz, 63 to 118 Hz, 119 to 122 Hz, 123 Hz to 1 KHz, greater than 1 KHz to 7.5 KHz, greater than 7.5 KHz to 50 KHz.

According to another aspect of the present invention there is provided an optical transmission system having two or more optical elements and transient monitoring means arranged to detect transients in said system, wherein said means are arranged to determine the cause of each of said transients by monitoring variations in system characteristics.

Preferably, the optical transmission system monitoring means includes a plurality of detectors located throughout the optical transmission system with one detector being placed between each of the optical elements in the system, the means also including monitoring means arranged to compare the outputs of the detectors.

According to yet another aspect of the present invention there is provided transient monitoring means arranged to detect transients within an optical transmission system, wherein said means are arranged to determine the cause of each of said transients by monitoring variations in system characteristics.

According to yet another aspect of the present invention there is provided transient monitoring means arranged to detect transients in an optical transmission system, having two or more optical elements, wherein said means are arranged to determine in which optical element the transient is produced by monitoring variations in system characteristics.

BRIEF DESCRIPTION OF THE DRAWINGS

Embodiments of the present invention will now be described, by way of example, with reference to the accompanying drawings in which.

DETAILED DESCRIPTION OF THE INVENTION

Figure 1:
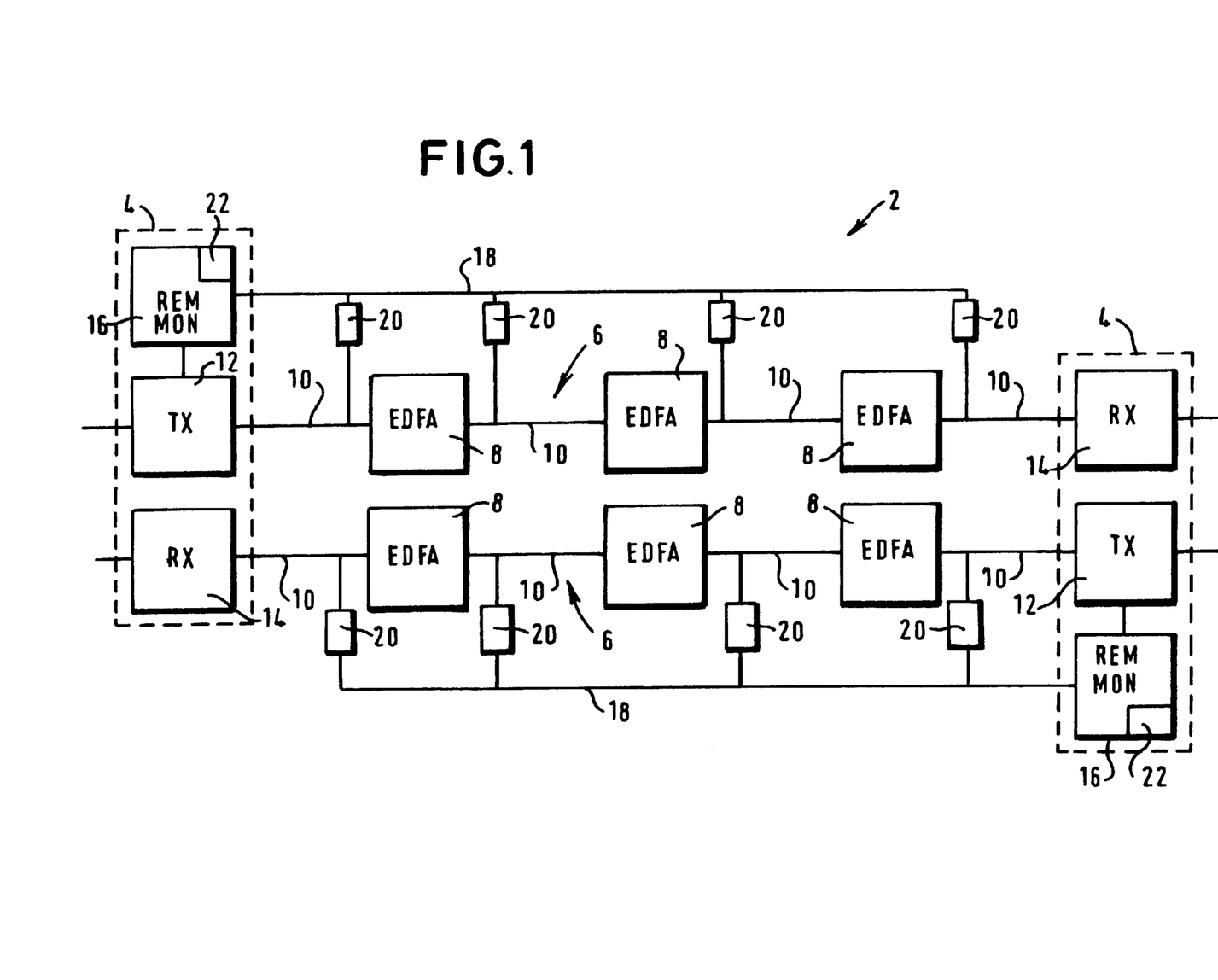
FIG. 1 is a block diagram of an optical fibre transmission system in accordance with the present invention.

FIG. 1 is a block diagram of a optical transmission system 2 in accordance with the present invention. The system 2 comprises a pair of optical terminals 4 which are interconnected by a pair of optical transmission lines 6, each of which comprises a chain of Erbium doped fibre amplifiers (EDFAs) 8 serially connected via sections of cabled optical fibre 10.

Each optical terminal 4 comprises an optical transmitter 12 and an optical receiver 14. The optical transmitter 12 converts high speed (approximately 2.5 Gbps) electrical data signals to optical signals for transmission over the optical transmission line 6 to corresponding optical receivers 14 which reconvert received optical signals to electrical signals. Each optical terminal 4 also comprises a remote monitoring unit 16 which is connected via a remote monitoring bus 18 to the detectors 20 one of which is located between each of the EDFA's 8.

Each detector 20 receives an optical input and produces an electrical output as will be described in detail below. The outputs of each of the detectors 20 is connected via the datapath 18 to the remote monitor 16 wherein they are compared one to the other in a comparator 22. Although the remote monitoring stations are located at the optical terminals in this example they may be located elsewhere such as in the EDFA or in a central control means (not shown) of a transmission system, particularly in a more complex transmission system than that shown in FIG. 1.

Figure 2:
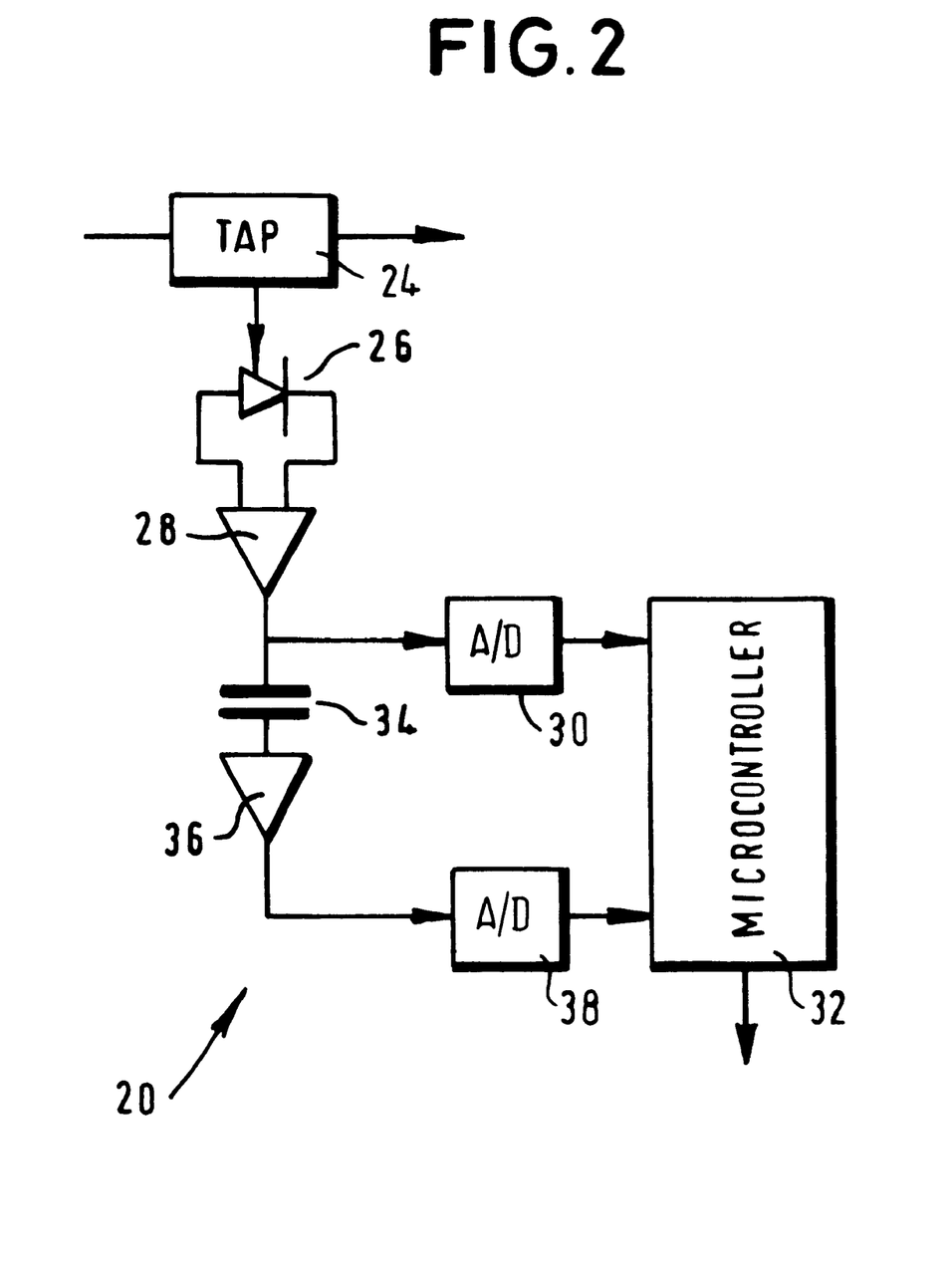
FIG. 2 is a block diagram of a detector in accordance with the present invention.

FIG. 2 shows a block diagram of a detector 20 in accordance with the present invention. The EDFA8 adjacent to the detector 20 is connected commonly includes a length of silica fibre coupled to a length of Erbium doped fibre. A tap 24, which is part of the detector 20, is located between the silica fibre and doped fibre. The tap 24 couples approximately 3% of the optical signal at the input of the Erbium doped fibre to a PIN diode 26. The PIN diode 26 converts the tapped optical signal to a photo-current, and transmits the photo-current to a transimpedance amplifier 28 which amplifies and converts the photo-current to a corresponding voltage. From there the voltage is transmitted to a first analogue to digital converter 30 which converts the analogue voltage to a digital code which estimates the total optical power of the tapped optical signal, this digital code being supplied to a microcontroller 32. The voltage is also transmitted via a capacitor 34 to an AC amplifier 36 which amplifies the AC component of the voltage. This amplified voltage signal is then converted in a second analogue to digital converter 38 and transmitted to the microcontroller 32. The output of the microcontroller is forwarded to the comparator 22 in the remote monitor via the datapath 18 so that the output of each monitor can be compared. Although the detectors 20 are located adjacent the Erbium doped fibre amplifiers 8 in this example they may be located at any points along the transmission line 6 and any number of detectors may be provided, as required. The detectors may also be used in a more complex transmission system.

One source of power level transients in an optical transmission system utilising Erbium doped fibre amplifiers is caused by mode-hopping in the Fabry-Perot laser used to pump each of the Erbium doped fibre amplifiers. Measurements have shown that these transients have the following characteristics:

step rising or falling from a quiescent base;
a rise/fall time of 40 to 70 microseconds, with an amplitude of 2% to 20% of a quiescent base;
variable pulse shapes following an initial peak;
an overall transient lasting 100 to 500 microseconds; and
up to six major sub-transients within a single transient event.

As stated above the detectors 20 are each connected to the comparator 22 which either directly compares the outputs of each of the detectors 20 or more preferably scales, phase aligns and then subtracts the data provided from adjacent detectors in order to eliminate the effect of variations that are common to the two detectors. The comparator then accumulates long term mean and RMS variations in the provided signal and determines that a transient has occurred relative to these statistics. If a transient has not occurred the mode-hopping analysis array is terminated and further data is accumulated for additional study.

If a transient is detected the peak value as a proportion of the quiescent base is calculated and the start of the transient is located. The rise/fall time of the start of the transient is then determined and the end of the transient is located in order to calculate the duration of the transient.

The number of sub-transients within the overall transient event is then determined and if this number is greater than six the mode-hopping analysis is terminated. If this number is less than or equal to six and the rise time is within the aforementioned parameters along with the amplitude being within the aforementioned percentage of the quiescent base then a determination is made as to whether or not the transient is due to pump laser mode-hopping, if the transient is determined to come from this feature a report to this effect can be provided by the comparator 22 to a remote monitoring station (not shown).

During this analysis constant thresholds, chosen for a particular system, alpha, beta and gamma are selected. Once the peak in a sample array is determined a determination as to whether or not this peak is greater than alpha times the long-term RMS variation away from the long-term mean is made. If this peak is not greater than alpha times the long-term RMS variation then the signal is not large enough to analyze and a negative response is issued by the comparator. If on the other hand the magnitude is greater then the system continues to analysis the data. The fast fourier transform of the sample array after removing the DC component and windowing is then computed. For each frequency, the sum of the power at that frequency and integer multiples of that frequency is determined in order to find the largest set of harmonic powers. If this power is greater than beta times the long-term RMS variation squared then a true value is provided if not the comparator provides a signal to the effect that not enough information is present for determination.

The determination as to whether or not pump mode-hopping has caused the transient is provided from empirically derived and tabulated joint distributions of the rise/fall time duration and amplitudes of the transients due to pump mode-hopping. The probability that a mode-hopping event has occurred is then determined. Similarly, a calculation is made as to the probability of noise or random transients causing the event which have these features. If the ratio of the probability is greater than gamma the determination is made that pump mode-hopping has caused the event.

Figure 3:
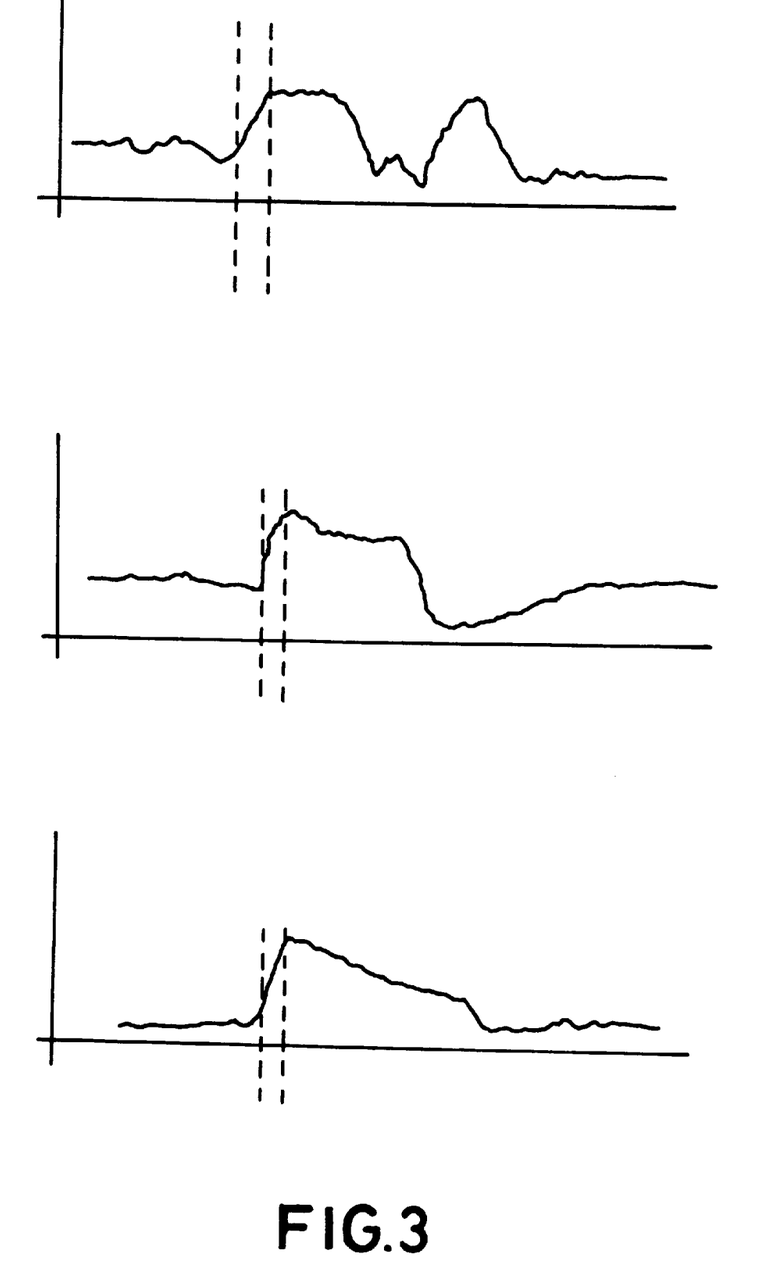
FIG. 3 is a graphic representation of transients caused by mode-hopping in a pump laser of an Erbium doped fibre amplifier of the system of FIG. 1.

Examples of graphic representation of the data provided due to mode-hopping is illustrated in FIG. 3.

Another example of a transient which the system can detect is that due to mechanical vibration in the system resulting from an electrical motor. An electrical motor will produce vibrations with a harmonic of the frequency of the AC supply to the motor e.g. 60 Hz in USA and 50 Hz in the United Kingdom.

Figure 4:
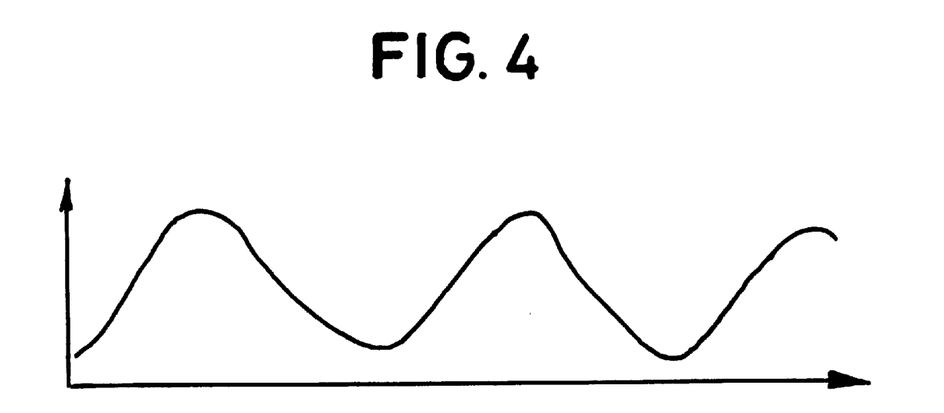
FIG. 4 is a graphic representation of transients due to mechanical vibration from an electrical apparatus.

FIG. 4 illustrates the graphic representation of the transients produced by mechanical vibrations. A similar algorithm is gone through in order to ascertain whether or not the transient data is provided due to mechanical vibrations of this type. However, instead of measuring rise time and overall number of sub-transients in a transient event the frequency separation of the characteristic harmonics is measured and provided the aforementioned error determination is such that the signal is sufficient to provide an appropriate determination of the cause of a transient a decision that the transient is due to mechanical vibration due to an electrical motor may be made.

Figure 5:
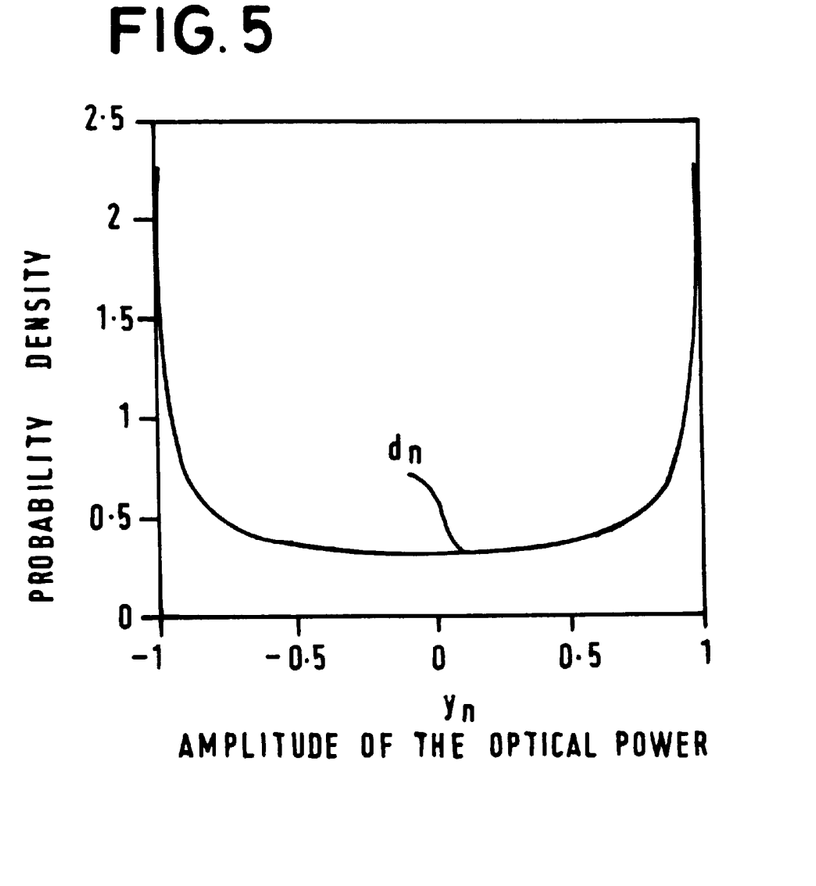
FIG. 5 illustrates the probability distribution of amplitudes of optical power indicative of a linear polarisation transient.

Linear polarisation variations interact with polarisation dependent loss/gain in an optical element to create amplitude variations that are a function of the sine of the polarisation angle. This produces a distinctive signature in that its saddle-shaped probability distribution can be identified by binning the amplitude values measured in the lower frequencies. An example of such a saddle-shaped probability distribution is illustrated in FIG. 5.

This binning is accomplished by selecting the elements of the array X(f) in the low frequency and hum bands, and zeroing the rest of the elements along with the DC element. The inverse FFT of this produces an array v(t). The array is then scaled to have an excursion from −127 to +127, and array bins (−127:127) are created which are initialised to zeros. Then for each element of v(t), the array element bins may be incremented by one round (v(t)).

This polarisation variation signature is most distinct when the distributed source of the polarisation variation and the polarisation dependent gain are sequential. Where the sources of the variation and multiple gain depend elements are interspersed, multiple saddle distributions are then convolved, and so the signature is more complicated and less distinct.

When the polarisation variation is elliptical then the distinctive signature is a uniform distribution.

These different specific extracted results can be compared between the different measurement points along the optical link by the comparison element and increases in the level of particular features beyond a threshold may trigger an alarm. Clearly, comparison of the levels isolates the source of that feature to the element between the monitor points.

Another method of analysis is to scale, phase align, and then subtract two arrays from two monitor points. This substantially eliminates the effect of variations such as data patterning that are common to the two monitor sites, and allows the transients and the variations caused by the optical elements between the two monitor points to be measured and identified. This is the preferred implementation when both monitor points are within the same network element.

Also, amplitude measurements can be correlated to other measurements such as:

wavelength of the light, environmental temperature, time of day, data pattern, signed content, AGC level, clock jitter, Phase of the signal frame, and bit error rate or eye closure to further isolate the source of the transient.

As stated above the method and apparatus are also capable of determining the occurrence of phase transients.

Optical regenerators and optical transponders are parts of an optical transmission system that may recover the clock from the data stream. Unlike traditional electrical regenerators, such as a SONET Regenerator, these new units do not acquire frame alignment, nor measure the bit error rate.

The process of clock recovery can be degraded, or fail, or introduce transients. These clock recovery problems are not detected until reaching the traditional electrical regenerator or terminal at the end of the optical path that is able to perform a measurement of the frame alignment and the bit error rate. It is thus difficult to isolate the source of the transient between the transmitter, a number of optical regenerators or transponders, and the receiver, which may be separated by hundreds of kilometers.

In, for example, an optical regenerator that recovers the clock from the data, the phase error voltage can be monitored. Additionally the tuning voltage can be monitored. From either of these voltages, the pattern of degradations, failures, and transients present can be identified and the appropriate alarms generated.

Figure 6A:
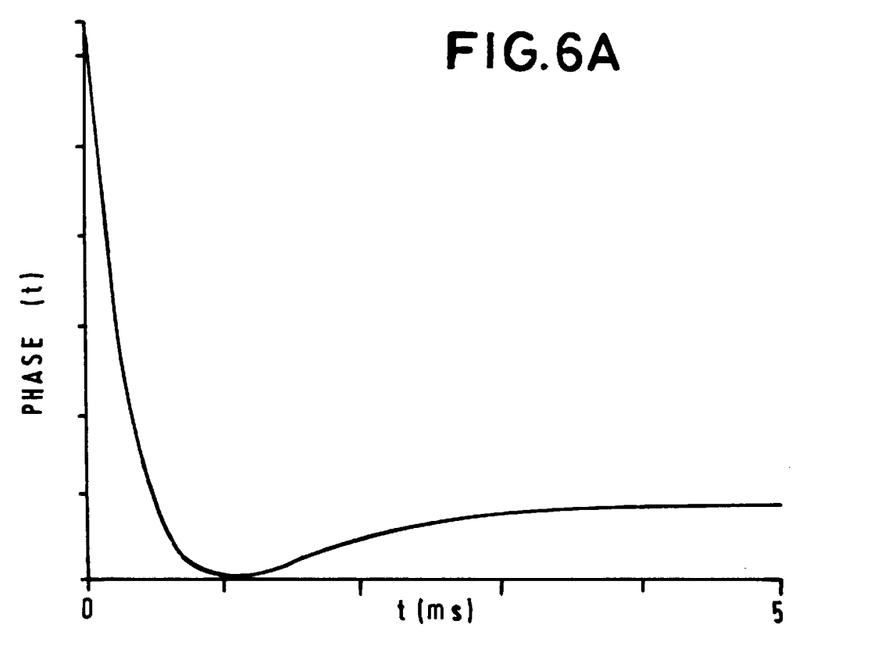
FIG. 6A illustrates a phase transient due to a slip in phase-alignment.
Figure 6B:
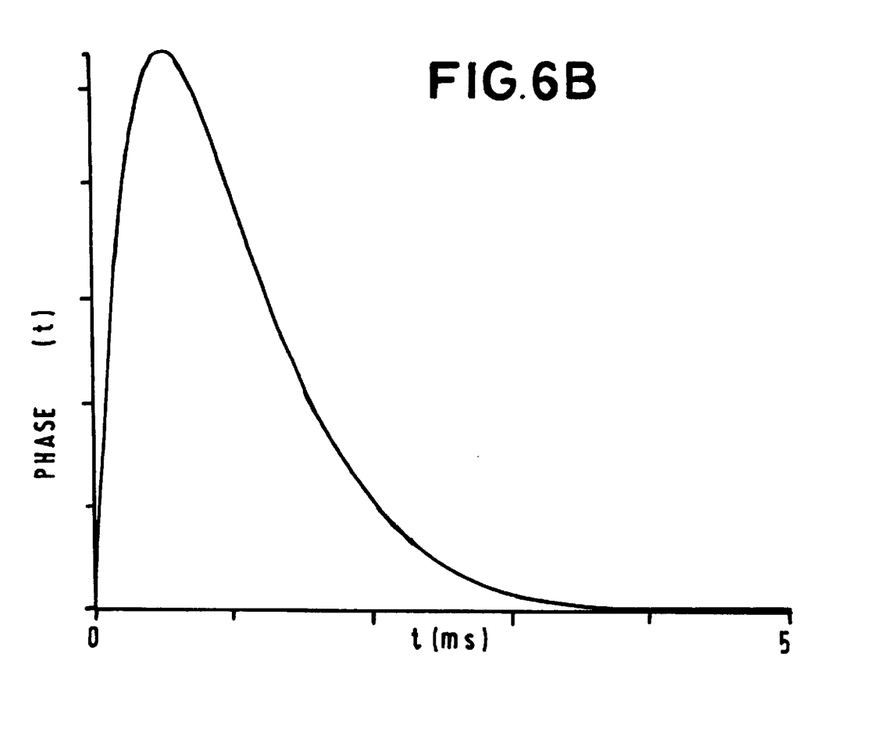
FIG. 6B illustrates a phase transient due to frequency jump degradation in the oscillator.
Figure 6C:
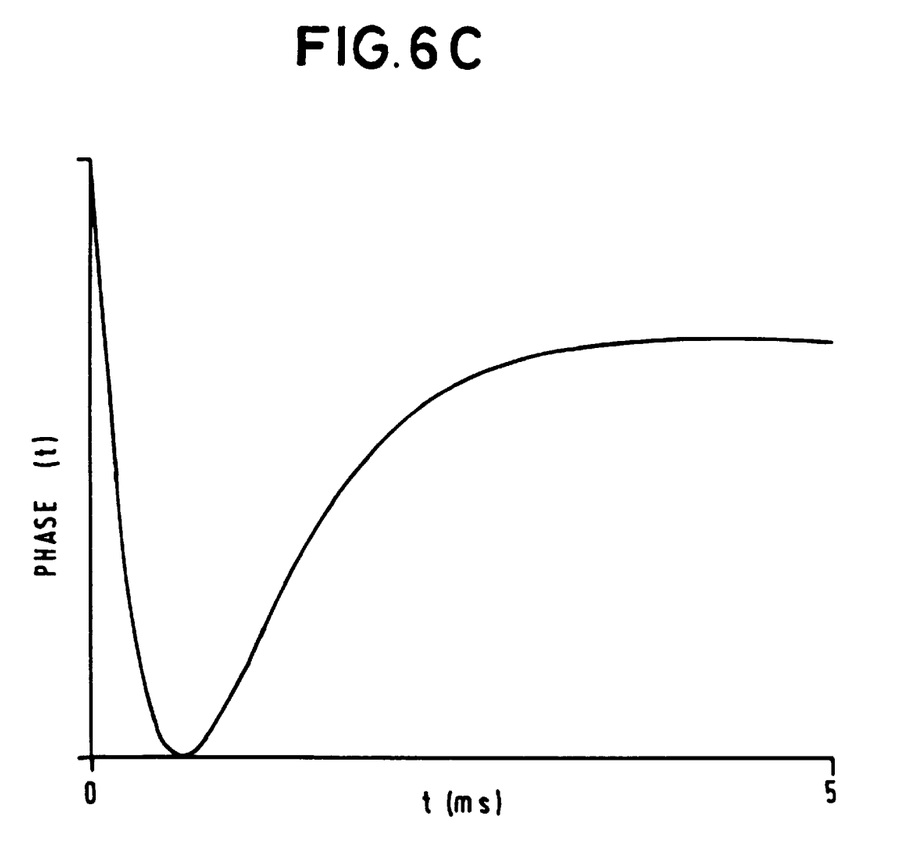
FIG. 6C illustrates a phase transient due to a frequency jump causing phase slip.

The graphs in FIGS. 6A to 6C show, for the purpose of example, the characteristic transient shapes for three events that occur two regenerators upstream from the monitor point, at a phase detector with a saw-tooth characteristic. FIG. 6A shows the response to a phase slip where the phase alignment has slipped into the next bit period. FIG. 6B shows the response to a frequency jump degradation in the oscillator; and FIG. 6C shows where a frequency jump has caused a phase slip. Passing through additional regenerators would have further filtered these transients. The source of the transient as being from two regenerators upstream can be determined by matching to these shapes.

The characteristic transient shapes for a particular system can be calculated as a function of the system parameters and of the location of the source of the transient. Alternatively empirically measured transient shapes can be collected.

Jitter values and distributions can also be calculated in the manner already described for power transients.

The "U" shaped distribution that was calculated for linear polarisation variation as illustrated in FIG. 5 is also the characteristic of phase jitter due to a sinusoidal beat product from another clock, or switching power supply interference.

A gaussian jitter distribution is characteristic of oscillator flicker noise.

Similarly to the case of the power transients, examination of the phase spectrum can identify particular sources of transients. A beat product from another clock will occur at a frequency equal to the difference between the two clock frequencies. Switching power supply interference occurs at an harmonic of the frequency of switching in the supply.

This information allows rapid fault isolation of clock problems along an optical path.

Specific jitter patterns can be imparted onto the data for purposes such as signalling the failure of incoming signals or generation of an Alarm Inhibit signal. This is especially valuable in optical regenerators where it is difficult to generate a high-speed data pattern.

For example, an Alarm Indication Signal is generated by an optical regenerator, and is detected by the next optical regenerator downstream by having a specific dither pattern applied to the clock that can be detected as jitter in the downstream data.

Figure 7:
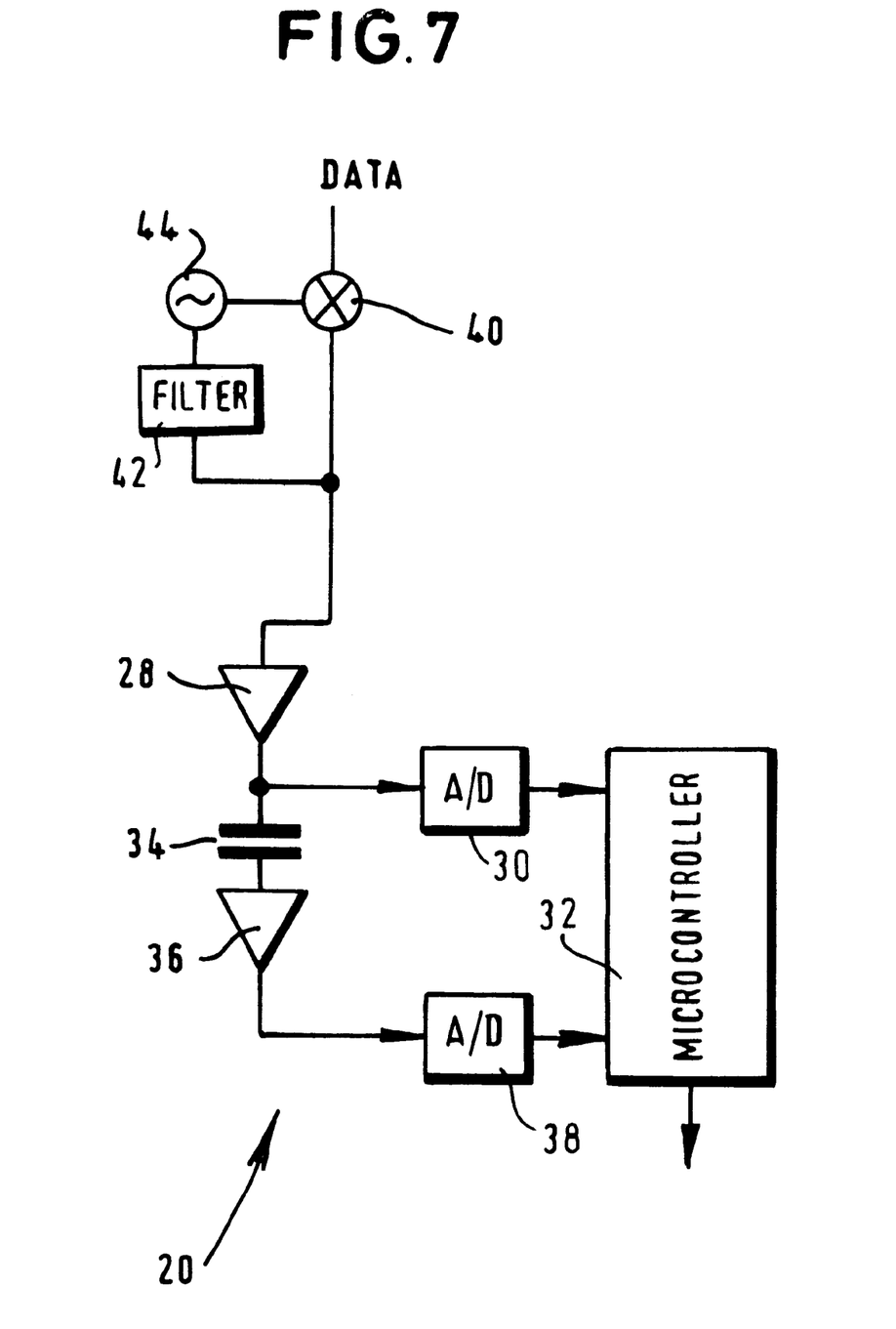
FIG. 7 illustrates a phase transient detector in accordance with the present invention.

The apparatus used to detect phase transients is illustrated in FIG. 7, in which components common to the power transient circuit, FIG. 2, have the same reference numerals and operate in a corresponding manner. The inputs to the amplifier 28 do not come from a tap 24 and a PIN diode 26, but instead from a clock recovery means in the form of a phase locked loop having an optical phase detector 40 which produces a phase error voltage which is supplied to both the amplifier 28 and to a filter 42 producing a tuning voltage which is used to drive an oscillator 44 which is in turn connected to the optical phase detector 40.

Modifications may be made to the method and apparatus disclosed herein without departing from the scope of the invention as claimed. For example, the comparator may be configured to measure a variety of different features including mean, slope, relative slope RMS variations and other characteristics all of which may be utilised in determining which phenomenon has caused a transient or which optical element the transient has produced.

What is claimed is:

1. A method of monitoring transients in an optical transmission system having two or more optical elements, the method comprising detecting the existence of a transient in said system and determining the cause of the transient by monitoring variations in system characteristics.

2. The method of claim 1, wherein the system is monitored at a plurality of monitoring points.

3. The method of claim 2, wherein a monitoring point is located between each of the optical elements in the system.

4. The method of claim 2, wherein a comparison is made between the information provided from each of the monitoring points.

5. The method of claim 4, wherein a data array provided by adjacent monitoring points is scaled, phase aligned and then subtracted in order to eliminate the effect of variations that are common to the two monitoring points.

6. The method of claim 4, wherein the specific data extracted from adjacent measuring points are directly compared.

7. The method of claim 1, wherein the transient is a power transient.

8. The method of claim 7, wherein transient rise time is determined and compared with rise times of transients for known phenomenon.

9. The method as claimed in claim 7, wherein overall transient shape is determined and compared with that of transients for known phenomenon.

10. The method as claimed in claim 9, wherein the number of rises in an overall transient is measured and compared with the number of rises in transients from known phenomenon.

11. The method as claimed in claim 7, wherein distinct spectral lines, such as harmonics, are determined.

12. The method of claim 7 wherein the distribution of power levels is determined.

13. The method of claim 1, wherein the transient is a phase transient.

14. The method of claim 13 wherein said transients are due to clock recovery elements.

15. The method of claim 13 wherein said phase transients are cycle slips.

16. The method of claim 13 wherein said phase transients are intentionally induced for signalling purposes.

17. The method of claim 13, wherein said phase transients are gaussian noise.

18. A method of monitoring transients in an optical transmission system having two or more optical elements, the method comprising detecting the existence of a transient in said system and determining in which optical element the transient is produced by monitoring variations in system characteristics.

19. The method of claim 18, wherein the system is monitored at a plurality of monitoring points.

20. The method of claim 19, wherein a monitoring point is located between each of the optical elements in the system.

21. The method of claim 19, wherein a comparison is made between the information provided from each of the monitoring points.

22. The method of claim 21, wherein the data array provided by adjacent monitoring points is scaled, phase aligned and then subtracted in order to eliminate the effect of variations that are common to the two monitoring points.

23. The method of claim 21, wherein the specific data extracted from adjacent measuring points are directly compared.

24. The method of claim 18, wherein comparison of the data provided from adjacent monitoring points isolates the source of a transient to the optical component placed between those monitoring points, if such comparison results in the detection of a transient.

25. An optical transmission system having two or more optical elements and transient monitoring means arranged to detect transients in said system, wherein said means are arranged to determine the phenomenon causing each of said transients and/or the element in which the transient is produced by monitoring variations in system characteristics.

26. The system of claim 25, wherein said transient monitoring means includes a plurality of detectors located throughout said optical transmission system.

27. The system of claim 26, wherein one of said plurality of detectors is placed between each optical element in the system.

28. The system of claim 26, wherein said monitoring means comprises a comparator means arranged to compare the outputs of the detectors.

29. Transient monitoring means arranged to detect transients within an optical transmission system, wherein said means are arranged to determine the cause of each of said transients by monitoring variations in system characteristics.

30. The transient monitoring means of claim 29, wherein said transient monitoring means includes a plurality of detectors arranged for location throughout said optical transmission system, when in use.

31. The transient monitoring means of claim 30, wherein one of said plurality of detectors is placed between every optical element in the system, when in use.

32. The transient monitoring means of claim 30, wherein said monitoring means comprises a comparator means arranged to compare the outputs of the detectors.

33. The transient monitoring means of claim 29, wherein said means are adapted for the detection of transients in optical power levels within an optical transmission system.

34. The transient monitoring means of claim 32, wherein the comparator is arranged to determine the rise time of a transient and compare the detected rise time with the rise time of transients from known phenomenon.

35. The transient means of claim 29, wherein the comparator is arranged to determine the overall transient shape and compare that with the shape of transients from known phenomenon.

36. The transient monitoring means of claim 35, wherein the number of rises in a overall transient is measured and compared with that of transients from known phenomenon.

37. The transient monitoring means of claim 29, wherein the means is adapted to detect phase transients.

38. A transient monitoring means arranged to detect transients in an optical transmission system, having two or more optical elements, wherein said means are arranged to determine in which optical element the transient is produced by monitoring variations in system characteristics.

39. The system of claim 38, wherein said transient monitoring means includes a plurality of detectors arranged for location throughout said optical transmission system, when in use.

40. The transient monitoring means of claim 39, wherein one of said plurality of detectors is placed between every optical element in the system, when in use.

41. The transient monitoring means of claim 39, wherein said monitoring means comprises a comparator means arranged to compare the outputs of the detectors.

42. The transient monitoring means of claim 41, wherein the comparator is arranged to compare the data provided from adjacent monitoring points isolating the source of a transient to the optical component placed between those monitoring points, if such comparison results in a detection of a transient.

43. The transient monitoring means as claimed in claim 39, wherein the means are adapted to detect transients in optical power levels.

44. The transient monitoring means of claim 39, wherein the means are arranged to detect phase transients.

* * * * *

UNITED STATES PATENT AND TRADEMARK OFFICE
CERTIFICATE OF CORRECTION

PATENT NO. : 6,222,652 B1  
DATED : April 24, 2001  
INVENTOR(S) : Robert et al.

Page 1 of 1

It is certified that error appears in the above-identified patent and that said Letters Patent is hereby corrected as shown below:

<u>Title page,</u>  
Item [75], Inventors, should read -- Kim Byron Roberts and Mark Acton Gibbon, Herts (GB).

Signed and Sealed this

Second Day of April, 2002

Attest:

JAMES E. ROGAN  
*Attesting Officer*   *Director of the United States Patent and Trademark Office*